United States Patent
Neth (10) Patent No.: US 10,953,508 B2
(45) Date of Patent: Mar. 23, 2021

(54) ROTARY INDEXING MACHINE

(71) Applicant: WINEMA Maschinenbau GmbH, Grosselfingen (DE)

(72) Inventor: Eckhard Neth, Bisingen (DE)

(73) Assignee: WINEMA Maschinenbau GmbH, Grosselfingen (DE)

( * ) Notice: Subject to any disclaimer, the term of this patent is extended or adjusted under 35 U.S.C. 154(b) by 396 days.

(21) Appl. No.: 15/848,211

(22) Filed: Dec. 20, 2017

(65) Prior Publication Data

US 2018/0200855 A1 Jul. 19, 2018

(30) Foreign Application Priority Data

Dec. 21, 2016 (DE) .................... 10 2016 125 237.9

(51) Int. Cl.
*B23Q 39/04* (2006.01)
*B23Q 7/02* (2006.01)
(Continued)

(52) U.S. Cl.
CPC ............... *B23Q 16/10* (2013.01); *B23B 3/30* (2013.01); *B23Q 1/012* (2013.01); *B23Q 1/626* (2013.01);
(Continued)

(58) Field of Classification Search
CPC ............ Y10T 29/5124; Y10T 29/5125; Y10T 82/25; Y10T 82/2514; Y10T 483/16;
(Continued)

(56) References Cited

U.S. PATENT DOCUMENTS

| | | | |
|---|---|---|---|
| 3,423,812 A * | 1/1969 | Spur | B23B 3/30 29/38 A |
| 3,643,307 A * | 2/1972 | Ledergerber | B23B 3/168 29/38 B |

(Continued)

FOREIGN PATENT DOCUMENTS

| | | | |
|---|---|---|---|
| DE | 2047310 A1 * | 4/1971 | ............... B23Q 7/04 |
| DE | 42 28 308 A1 | 3/1994 | |

(Continued)

OTHER PUBLICATIONS

European Search Report dated May 7, 2018 issued in corresponding EP patent application No. 17209227.2 (and partial English translation).

(Continued)

*Primary Examiner* — Erica E Cadugan
*Assistant Examiner* — Michael Vitale
(74) *Attorney, Agent, or Firm* — Posz Law Group, PLC (57) ABSTRACT

A rotary indexing machine comprises at least one indexing plate, which is in at least one operating state configured to accommodate and transport at least one work piece, and with at least one clocking cell comprising at least one accommodating unit with at least two opposite-situated accommodating elements, which are configured for together accommodating the at least one work piece from the indexing plate, and comprising at least one machining unit for machining the work piece accommodated by the accommodating unit, wherein the at least one clocking cell comprises at least one bridge unit, which extends at least partially over the indexing plate in an axial direction and is configured to guide the at least two accommodating elements of the accommodating unit in a shared coordinate system.

9 Claims, 8 Drawing Sheets

(51) Int. Cl.
  *B23Q 7/10* (2006.01)
  *B23Q 7/04* (2006.01)
  *B23Q 1/01* (2006.01)
  *B23B 3/30* (2006.01)
  *B23B 29/24* (2006.01)
  *B23Q 16/10* (2006.01)
  *B23Q 1/62* (2006.01)
  *B23B 3/06* (2006.01)
  *B23Q 39/00* (2006.01)

(52) U.S. Cl.
  CPC ............. *B23Q 7/02* (2013.01); *B23Q 7/047* (2013.01); *B23Q 7/10* (2013.01); *B23Q 39/044* (2013.01); *B23B 3/065* (2013.01); *B23Q 2039/008* (2013.01); *Y10T 29/5124* (2015.01); *Y10T 29/5125* (2015.01); *Y10T 82/2524* (2015.01)

(58) Field of Classification Search
  CPC ........... B23Q 7/02; B23Q 7/047; B23Q 7/10; B23Q 16/10
  USPC ............... 29/37 R, 563; 82/117, 124; 483/14
  See application file for complete search history.

(56) References Cited

U.S. PATENT DOCUMENTS

| | | | | |
|---|---|---|---|---|
| 3,673,898 A | * | 7/1972 | Bronzini | B23Q 1/012 82/124 |
| 4,571,796 A | * | 2/1986 | Sellner | B23B 3/168 29/27 R |
| 5,115,546 A | * | 5/1992 | Mitsukuchi | B23B 3/06 29/27 C |
| 5,127,140 A | * | 7/1992 | Oiwa | B23B 3/167 29/27 C |
| 10,343,246 B1 | * | 7/2019 | Rowe | B23Q 39/028 |
| 2008/0202297 A1 | * | 8/2008 | Hirose | B23B 29/16 82/159 |
| 2009/0208314 A1 | | 8/2009 | Lube | |
| 2014/0318331 A1 | * | 10/2014 | Walz | B23B 3/16 82/120 |

FOREIGN PATENT DOCUMENTS

| | | | | |
|---|---|---|---|---|
| DE | 10 2008 009 989 A1 | 8/2009 | | |
| DE | 10 2010 029 721 A1 | 12/2011 | | |
| EP | 1084794 A1 | * 3/2001 | ........... | B23Q 7/1426 |
| EP | 2033735 A1 | 3/2009 | | |
| JP | 05038603 A | * 2/1993 | ............... | B23Q 7/04 |
| JP | H05-53803 U | 7/1993 | | |
| JP | 06190602 A | * 7/1994 | | |

OTHER PUBLICATIONS

Search Report dated Aug. 16, 2019 issued in corresponding DE patent application No. 10 2016 125 237.9 (and English translation).
Office Action dated Nov. 13, 2019 issued in corresponding EP patent application No. 17 209 2272 (and English translation).

* cited by examiner

ROTARY INDEXING MACHINE

CROSS REFERENCE TO RELATED APPLICATION

This application is based on and incorporates herein by reference German Patent Application No. 10 2016 125 237.9 filed on Dec. 21, 2016.

PRIOR ART

The invention relates to a rotary indexing machine and to a method for operating a rotary indexing machine.

A rotary indexing machine with at least one indexing plate, which is in at least one operating state configured to accommodate and transport at least one work piece, and with at least one clocking cell comprising at least one accommodating unit with at least two opposite-situated accommodating elements, which are configured for together accommodating the at least one work piece from the indexing plate, and comprising at least one machining unit for machining the work piece accommodated by the accommodating unit, has already been proposed.

The objective of the invention is in particular providing a generic device having improved characteristics regarding precision as well as machinability of work pieces. The objective is achieved according to the invention by the features of the independent claim while advantageous implementations and further developments of the invention may be gathered from the dependent claims.

ADVANTAGES OF THE INVENTION

The invention is based on a rotary indexing machine with at least one indexing plate, which is in at least one operating state configured to accommodate and transport at least one work piece, and with at least one clocking cell comprising at least one accommodating unit with at least two opposite-situated accommodating elements, which are configured for together accommodating the at least one work piece from the indexing plate, and comprising at least one machining unit for machining the work piece accommodated by the accommodating unit.

It is proposed that the at least one clocking cell comprises at least one bridge unit, which extends at least partially over the indexing plate in an axial direction and is configured to guide the at least two accommodating elements of the accommodating unit in a shared coordinate system. Preferably the bridge unit is configured to guide the at least two accommodating elements in guidances. Preferentially the guidances of the at least two accommodating elements of the bridge unit are aligned with one another in a defined manner. Especially preferentially a coordinate system of the bridge unit differs from a coordinate system of the indexing plate of the rotary indexing machine. By a "rotary indexing machine" is herein in particular, in this context, a machine, preferably a machine tool, to be understood, comprising at least one indexing plate which, in at least one operating state, at least one work piece, in particular a plurality of work pieces, is/are clamped in. It is preferentially to be understood as a machine with a plurality of machining stations, in particular clocking cells, for machining the at least one work piece. The work piece is preferably conveyed from one machining station to the other one by means of the indexing plate. Especially preferentially the machining stations are arranged around the indexing plate in a circular shape. Preferably the machine moreover comprises at least one feed unit for loading the indexing plate and at least one retrieving unit for a retrieval of the machined work pieces from the indexing plate. Rotary indexing machines are also known as rotary table machines or rotary transfer machines. Furthermore, an "indexing plate" is in particular, in this context, to mean a preferably at least partly circle-shaped work piece accommodation, which is configured for accommodating and conveying work pieces. It is preferably in particular to mean a work piece accommodation which is rotatably drivable and is configured to move the work pieces from one clocking cell to the following clocking cell. Preferentially the indexing plate comprises at least one gripping unit, which is preferably arranged on a circumference of the indexing plate and is configured to accommodate a work piece directly. Particularly preferably the indexing plate comprises a plurality of gripping units, which are preferentially regularly distributed in a circumferential direction. "Configured" is in particular to mean specifically programmed, designed and/or equipped. By an object being configured for a certain function is in particular to be understood that the object fulfills and/or carries out said certain function in at least one application state and/or operating state. By a "clocking cell" is furthermore in particular, in this context, a machining cell of the rotary indexing machine to be understood which is configured for a clocked machining of a work piece. Preferably the clocking cell is configured to machine one work piece per cycle. Preferentially the clocking cell is configured to carry out respectively one machining step of the rotary indexing machine. A variety of machining processes deemed expedient by someone skilled in the art are herein conceivable like, for example, drilling, milling, turning, rubbing, grinding, sawing, separating and/or other manufacturing methods, in particular machining and/or dividing manufacturing methods. By an "accommodating unit" is in particular, in this context, a unit to be understood which is configured for an, in particular temporary, removal of a work piece from the indexing plate. It is preferably to be in particular understood as a unit which is configured, for a machining of a work piece by the clocking cell, to remove the work piece from the indexing plate temporarily. Especially preferentially the unit is configured to remove, during one cycle of the rotary indexing machine, a work piece from the indexing plate for machining and to re-insert the work piece in the indexing plate after machining. By "the two opposite-situated accommodating elements being configured for together accommodating the at least one work piece from the indexing plate" is in particular, in this context, to be understood that the accommodating elements are configured for accommodating the at least one work piece together, in particular simultaneously. The accommodating elements are preferably configured to grip the at least one work piece from opposite directions and to clamp the work piece between them. For accommodating, the at least one work piece is preferentially clamped between the two opposite-situated accommodating elements. Preferably the accommodating elements each comprise a centering element, in particular a centering mandrel, which is configured to cooperate with, in particular to engage in, a centering element, in particular a centering bore, of the at least one work piece for the purpose of an accommodation. By a "machining unit" is in particular, in this context, a unit of the clocking cell to be understood which is configured for machining the accommodated work piece directly. Preferably the machining unit comprises at least one machining tool for machining the work pieces. Principally the machining unit may also comprise a plurality of machining tools. Preferentially the machining unit is in particular configured for a machining and/or dividing processing of the at least one work piece. Particularly preferably a processing of the work piece by the machining unit takes place during one cycle of the processing machine. Various machining tools are conceivable which are deemed expedient by someone skilled in the art, e.g. drills, milling cutters, cutting wheels and/or turning chisels. Moreover, a "bridge unit" is in particular, in this context, to mean an inherently rigid unit serving as a support frame of the clocking cell. It is preferably to mean a frame supporting the accommodating unit and the machining unit of the clocking cell in an at least substantially deformation-free manner. The bridge unit is preferentially embodied differently from a support structure of the rotary indexing machine. Especially preferentially the clocking cell is embodied self-supporting via the bridge unit. Herein "in an at least substantially deformation-free manner" is in particular to mean that, in a state when supported in a theoretically one-sided fashion, the clocking cell is subject to a vertical bending, in particular due to a bending load, of maximally 0.25 mm, preferably maximally 0.03 mm, preferentially maximally 0.01 mm, and particularly preferably maximally 0.005 mm over its entire extension. That "the bridge unit extends at least partially over the indexing plate in an axial direction", is in particular to mean, in this context, that the bridge unit is arranged at least partially radially adjacently to the indexing plate. Preferably it is in particular to mean that, viewed along a rotary axis of the indexing plate, the bridge unit extends over an axial extension of the indexing plate at least partially, in particular entirely. Preferentially the bridge unit extends over the indexing plate in an axial direction. By "the bridge unit being configured to guide the at least two accommodating elements of the accommodating unit in a shared coordinate system" is in particular to be understood, in this context, that the bridge unit comprises at least two guidances for the accommodating elements, the positions of which being defined via a shared coordinate system, in particular of the bridge unit. Preferably it is in particular to mean that the at least two accommodating elements are positioned with respect to each other in a manner defined by the bridge unit, independently from a position within the rotary indexing machine, in a manner defined by the bridge unit. Preferentially the at least two accommodating elements are movable with respect to one another in a manner defined by the bridge unit, independently from a position within the rotary indexing machine.

The implementation of the rotary indexing machine according to the invention in particular allows providing a rotary indexing machine with an advantageously accurate clocking cell in which the work piece is accommodated. This preferably allows achieving in particular an advantageously simple and reliable machinability of the accommodated work piece. It is in particular achievable that a position of the work piece within the clocking cell is known and may be secured. This facilitates an advantageously precise machining. Preferably the coordinate system allows a precise machining of the work piece independently from geometrically, thermally or vibrationally induced faults in the coordinate system of the indexing plate. It is in particular achievable that a work piece, in particular a rotationally symmetrical work piece, is machinable over its entire length or in a region that is required for a fixed clamping in the indexing plate and is thus not freely accessible for machining in the indexing plate. Moreover, by way of the clocking cell, an in particular rotationally symmetrical region is machinable, in particular turning-machinable, in such a way that said region fulfills an advantageously precise circular run requirement and/or coaxiality requirement, which are/is not achievable in a fixedly clamped state.

It is further proposed that the at least one bridge unit is configured to accommodate the at least two accommodating elements of the accommodating unit in such a way that they are guided with respect to one another in a defined fashion. Preferentially the at least two accommodating elements are implemented in such a way that they are immobile with respect to the bridge unit in a radial direction of the indexing plate. Especially preferentially the bridge unit comprises at least two opposite-situated guidances, each of which is configured for guiding one of the at least two accommodating elements. In this way in particular an advantageously reliable and accurate accommodation of the at least one work piece is achievable. Preferably this in particular allows facilitating a synchronous movement of the at least two accommodating elements.

Moreover it is proposed that the at least one machining unit is fixedly connected to the at least one bridge unit. Preferably the machining unit is arranged on the bridge unit. Preferentially the machining unit is partially movable with respect to the bridge unit. Especially preferentially the machining unit works in a coordinate system of the bridge unit. The machining unit in particular works in the same coordinate system as the accommodating elements of the accommodating unit. This in particular allows the work piece being traveled to by the machining unit in a particularly precise manner. In this way in particular advantageously precise machining may be rendered possible. In particular a precise machining may be rendered possible, in which inaccuracies due to geometrically, thermally or vibrationally induced faults may be avoided reliably.

It is furthermore proposed that the at least one machining unit is configured for a rotational machining of the work piece accommodated via the accommodating unit. Preferably the work piece is driven, in a state when accommodated by the accommodating unit, by the accommodating unit such that it rotates around a center axis. Preferentially the at least two accommodating elements are driven rotationally for a machining of the at least one work piece. Particularly preferably the clocking cell is implemented by a precision turning cell. In this way in particular a particularly reliable turning-clocking cell may be rendered available, wherein preferentially a rotational machining of an entire circumference of the work piece is possible as the work piece is removed from the indexing plate.

It is also proposed that the at least one machining unit comprises at least two tools for a machining of the work piece. Preferably the machining unit comprises at least two turning tools, in particular turning chisels. Preferentially the tools of the machining unit are fixed in their positions with respect to one another. Particularly preferably the at least two tools are together arranged on a tool carrier, which is implemented such that it is movable with respect to the bridge unit. It is preferentially possible to use the tools alternately for turning or milling machining. In particular, the desired tool may be selected by positioning an axis, in particular the y-axis, of the tool carrier. In this way in particular advantageously fast and flexible machining of the work piece is achievable. Preferably this in particular allows achieving a machining of the work piece in the same clocking cell with different tools.

Beyond this it is proposed that the at least one clocking cell comprises at least one hydraulic unit, which is configured to move a tool carrier of the at least one machining unit transversely to a rotary axis of the indexing plate. The tool carrier is preferentially configured to be moved with respect to the bridge unit by the hydraulic unit. Preferably the tool carrier is moved towards the work piece, transversely to a rotary axis of the indexing plate, via the hydraulic unit for the purpose of carrying out a turning operation or a milling operation. Preferentially the clocking cell further comprises an electric drive, which is configured for moving a tool carrier of the at least one machining unit perpendicularly to a rotary axis of the indexing plate. The tool carrier is preferably configured to be moved with respect to the bridge unit via the hydraulic unit and the electric drive. Preferentially the tool carrier is provided with three degrees of freedom, namely in particular along an x-axis, a y-axis and a z-axis. Especially preferentially the three degrees of freedom are controlled via the hydraulic unit and/or via the electrical drive. Preferably the hydraulic unit comprises at least one hydraulic axle drive and/or the at least one electrical drive comprises at least one electrical axle drive on the x-axis, on the y-axis and/or on the z-axis. A variety of implementations of the hydraulic axle drive are conceivable which are deemed expedient by someone skilled in the art, preferably the hydraulic axle drive is realized as a plunger cylinder. By a "hydraulic unit" is in particular, in this context, a unit to be understood with at least one hydraulic actuator, in particular with at least one hydraulic element, e.g. a hydraulic cylinder. Preferably it is in particular to mean a drive unit configured for moving the tool carrier. In this way in particular an advantageously precise moving of the tool carrier, and thus an advantageously precise machining of the work piece, may be made possible. Furthermore a suitable construction allows providing an advantageously compact clocking cell. Preferentially the compact construction is thus facilitated.

It is also proposed that, viewed in a plane that is perpendicular to a rotary axis of the indexing plate, the at least one bridge unit has at least partially a circular-sector shape. Preferably, viewed in a plane that is perpendicular to a rotary axis of the indexing plate, the bridge unit tapers towards a rotary axis of the indexing plate. The bridge unit is preferably embodied at least partly in a shape of a circular-cylinder sector. By the term that "the at least one bridge unit has at least partially a circular-sector shape" is in particular to be understood, in this context, that the bridge unit comprises, viewed in a plane that is perpendicular to a rotary axis of the indexing plate, at least two lateral edges tapering towards one another. The lateral edges preferably intersect at least approximately in a main extension plane of the bridge unit. Preferentially, viewed in a plane that is perpendicular to a rotary axis of the indexing plate, the lateral edges implement respectively one outer edge of the bridge unit. By a "main extension plane" of a structural unit is in particular a plane to be understood which is parallel to a largest side surface of a smallest imaginary rectangular cuboid just still enclosing the structural unit, and which in particular extends through the center of the rectangular cuboid. This in particular allows achieving an advantageously compact construction of the clocking cell. In this way it is in particular achievable that neighboring clocking cells are not negatively affected by the clocking cell. It is thus in particular achievable that two clocking cells may be integrated into the rotary indexing machine in such a way that they are directly subsequent to one another, as successive indexing stations.

Furthermore it is proposed that the rotary indexing machine comprises at least one further clocking cell, which is embodied at least substantially identically to the at least one clocking cell. Preferably the further clocking cell is also embodied by a precision turning cell. Preferentially the clocking cell and the further clocking cell are arranged directly adjacently to one another. Especially preferentially the clocking cells implement directly successive indexing stations. The further clocking cell is preferably embodied in such a way that it is completely identical to the at least one clocking cell. This in particular allows providing an advantageous rotary indexing machine.

It is moreover proposed that at least one of the at least two clocking cells is configured for a pre-machining and/or for a post-machining of the at least one work piece. Preferentially one of the at least two clocking cells is configured for a pre-machining and one of the at least two clocking cells is configured for a post-machining of the at least one work piece. This in particular allows achieving an advantageously precise machining, in particular rotational machining, of the work piece. Preferably in this way great material abrasion may be facilitated. Furthermore this allows usage of different tools in the two clocking cells.

It is also proposed that the at least one indexing plate comprises at least one gripping unit for accommodating the work piece, which has at least two gripping surfaces with substantially differing radii. Preferably the gripping unit comprises two gripping elements, which are arranged to be movable with respect to one another and form the two gripping surfaces. Preferentially a first radius of the gripping surface corresponds to a radius of the work piece prior to a machining by the clocking cell, and a second radius of the gripping surface corresponds to a radius of the work piece following a machining by the clocking cell. By a "gripping unit" is in particular, in this context, a unit to be understood which is configured to accommodate a work piece. Preferably it is in particular to mean a unit which is configured to accommodate the work piece in a gripping manner, preferentially by at least one gripping element. Preferably the gripping unit is arranged on an outer radius of the indexing plate. Particularly preferably the indexing plate comprises a plurality of gripping units, which are respectively configured to accommodate a work piece. This advantageously also allows reliably accommodating work pieces machined, in particular machined rotationally, on a gripping surface. In this way in particular a reliable and secure accommodation of a work piece may be facilitated, in particular for later processing as well.

It is preferably proposed that the at least one clocking cell is embodied in such a way that it is traversable with respect to the indexing plate. Preferentially the clocking cell comprises at least one drive and at least one guidance permitting the clocking cell to move with respect to the indexing plate. Preferably the clocking cell is movable in a direction that is perpendicular to a rotary axis of the indexing plate. The clocking cell is hence in particular movable towards the indexing plate or away from the indexing plate. Especially preferentially the clocking cell comprises at least one drive and at least one guidance, in particular a gantry drive, for gripping the work piece from a fixedly clamped position of the indexing plate, in particular from a first coordinate system, and to return the work piece if applicable, without requiring a further transport device. In this way in particular an advantageous mobility is achievable without needing structural components of the clocking cell to be moved with respect to each other. This allows providing an advantageously rigid system.

The invention is further based on a clocking cell of the rotary indexing machine, with at least one accommodating unit comprising at least two opposite-situated accommodating elements, which are configured for together accommodating the at least one work piece from the indexing plate of the rotary indexing machine, with at least one machining unit for a machining of the work piece accommodated by the accommodating unit, and with at least one bridge unit which extends at least partially over the indexing plate of the rotary indexing machine in an axial direction and is configured for guiding the at least two accommodating elements of the accommodating unit in a shared coordinate system.

Furthermore the invention is based on a method for operating the rotary indexing machine. It is proposed that in a removal step a clocking cell of the rotary indexing machine is brought into a removal position above an indexing plate of the rotary indexing machine and a work piece is removed from the indexing plate by an accommodating unit of the clocking cell. In the removal step the work piece is preferably removed from the coordinate system of the indexing plate, which in particular comprises fixedly installed machining stations, and is transferred into a new coordinate system of the clocking cell. This preferentially allows machining of an entire outer surface of the work piece. In this way it is moreover in particular achievable that for machining purposes the work piece is movable independently from the indexing plate. In particular the work piece is rotationally drivable.

Beyond this it is proposed that in a machining step the clocking cell is brought away from the indexing plate and into a machining position, and that the work piece is machined via a machining unit of the clocking cell. In the machining step the clocking cell is preferably brought away from the indexing plate and into the machining position together with the work piece. In particular a free machining of the work piece is achievable in this way. It is in particular possible to facilitate an advantageous accessibility of the work piece for the clocking cell. Advantageously a collision with the indexing plate is thus avoidable.

It is also proposed that in a feeding step the clocking cell is brought into the removal position above the indexing plate and the work piece is laid into a gripping unit of the indexing plate by the accommodating unit of the clocking cell. In the feeding step the work piece is preferably taken over by the accommodating unit of the clocking cell by means of the gripping unit. This advantageously permits reliably re-feeding the work piece to the clocking cell.

Further it is proposed that the removal step, the machining step and/or the feeding step are/is carried out during one cycle of the rotary indexing machine. The removal step, the machining step and the feeding step are preferably carried out during one cycle of the rotary indexing machine. This in particular allows providing advantageously fast machining of the work piece by the rotary indexing machine.

The rotary indexing machine according to the invention, the clocking cell and the method are herein not to be restricted to the application and implementation form described above. In particular, to fulfill a functionality herein described, the rotary indexing machine according to the invention, the clocking cell and the method may comprise a number of respective elements, structural components and units that differs from a number herein mentioned.

DRAWINGS

Further advantages will become apparent from the following description of the drawings.

The drawings show an exemplary embodiment of the invention. The drawings, the description and the claims contain a plurality of features in combination. Someone skilled in the art will purposefully also consider the features separately and will find further expedient combinations.

It is shown in.

DESCRIPTION OF THE EXEMPLARY EMBODIMENT

Figure 1:
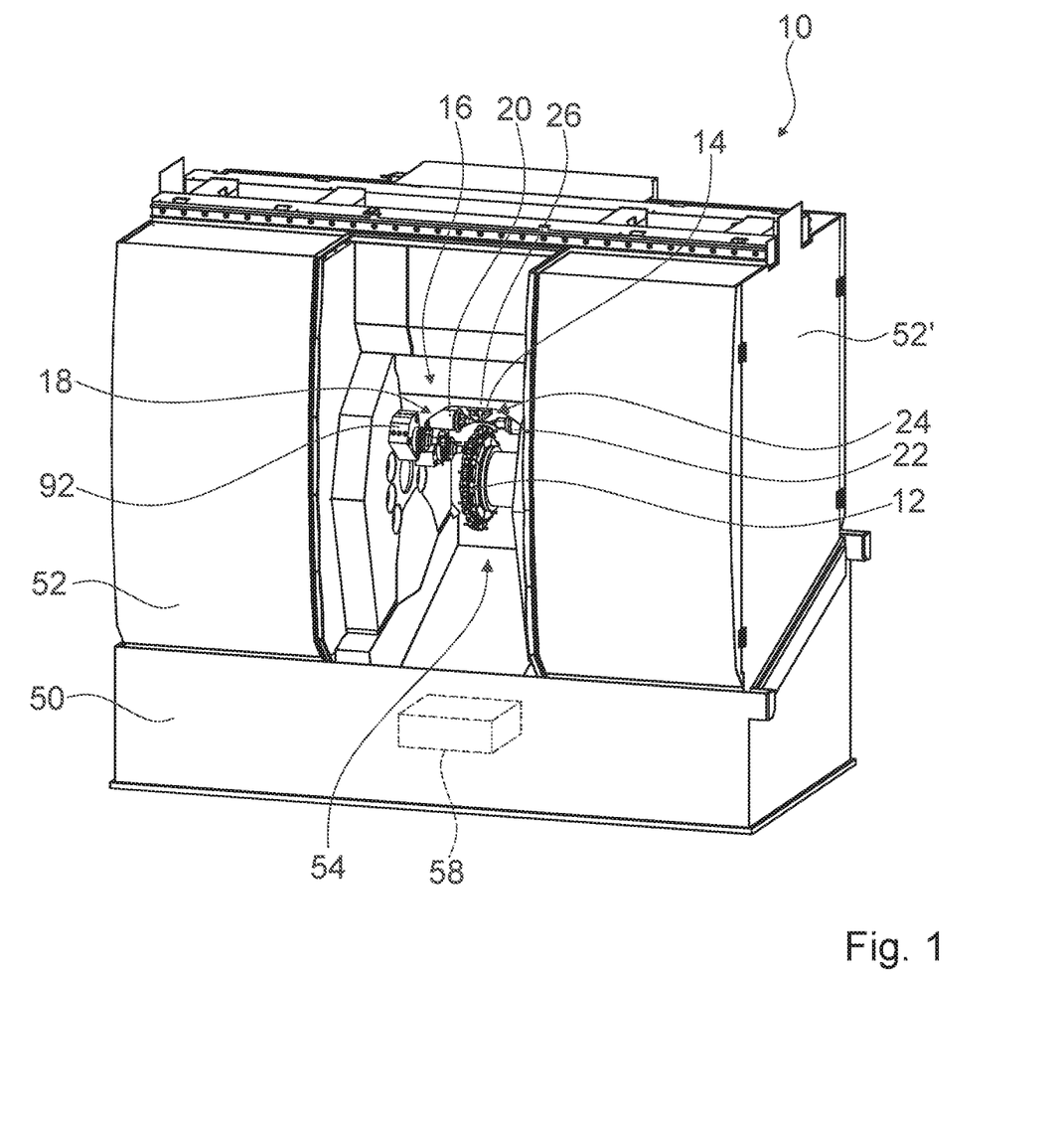
FIG. 1 a rotary indexing machine according to the invention with an indexing plate and with a clocking cell, in a schematic representation, FIG. 2 the rotary indexing machine according to the invention with the indexing plate and with the clocking cell in a removal position, in a schematic front view, FIG. 3 the rotary indexing machine according to the invention with the indexing plate and with the clocking cell in a machining position, in a schematic front view, FIG. 4 a partial section IV-IV of the rotary indexing machine according to the invention with the indexing plate and with the clocking cell in the removal position, in a schematic representation, FIG. 5 a partial section V-V of the rotary indexing machine according to the invention with the indexing plate and with the clocking cell in the machining position, in a schematic representation, FIG. 6 the rotary indexing machine according to the invention with the indexing plate, with the clocking cell and with a further clocking cell, in a schematic sectional view along the section line VI-VI, FIG. 7 a portion of the clocking cell with a bridge unit and with a machining unit, in a schematic representation, FIG. 8 a portion of the machining unit with a tool carrier and with two tools, in a schematic representation, FIG. 9 a partial section IX-IX of the indexing plate comprising a gripping unit, in a schematic representation, and FIG. 10 a schematic flow chart of a method for operating the rotary indexing machine.
Figure 2:
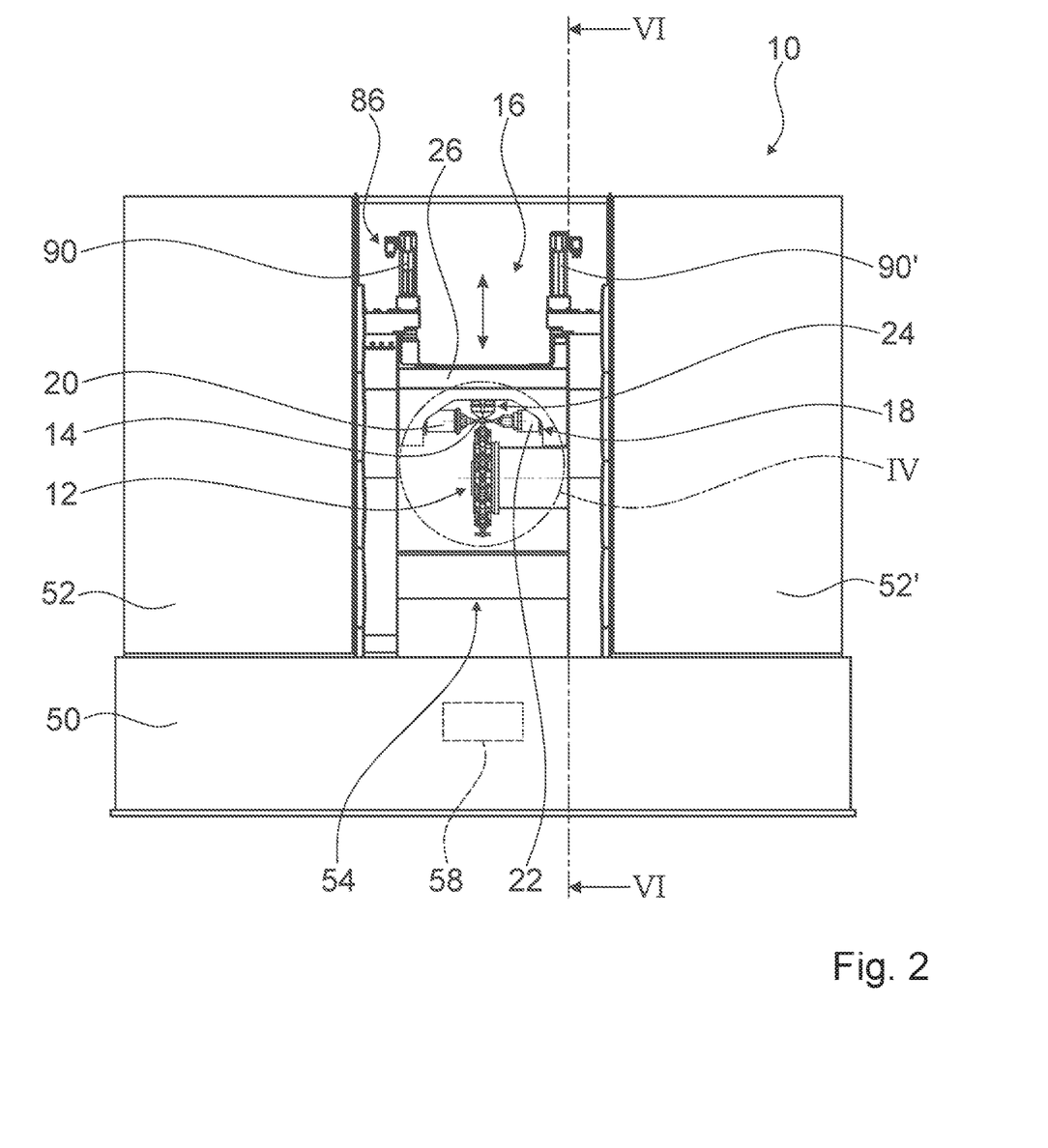
Figure 3:
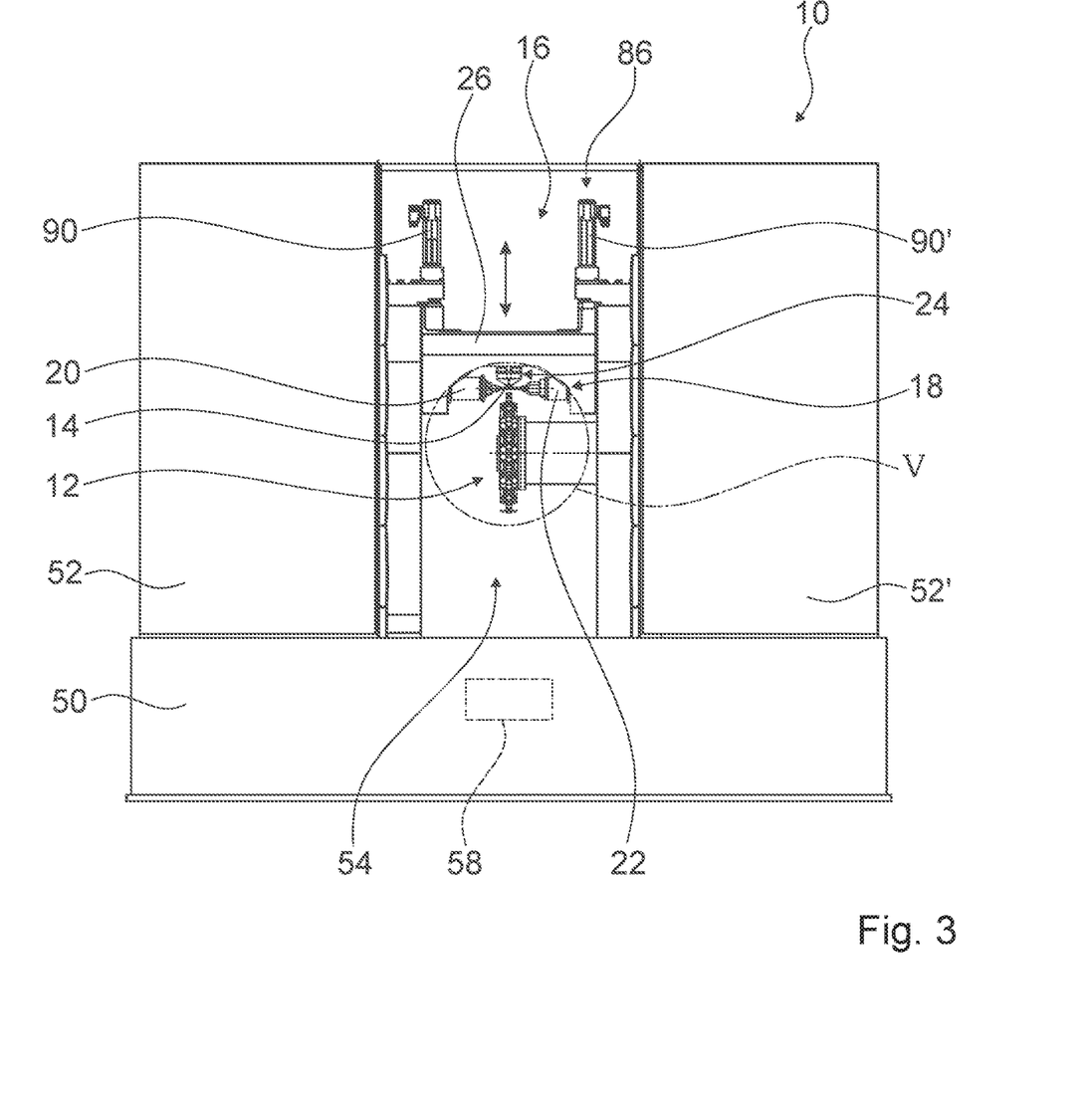

FIGS. 1, 2 and 3 show a rotary indexing machine 10. The rotary indexing machine 10 is configured for a clocked machining of work pieces 14. The rotary indexing machine 10 comprises a housing 50 as well as two drive regions 52, 52', which are enclosed by the housing 50. A machining space 54 is arranged between the two drive regions 52, 52'. The machining space 54 is closable via a cover, which is not shown in detail.

Figure 6:
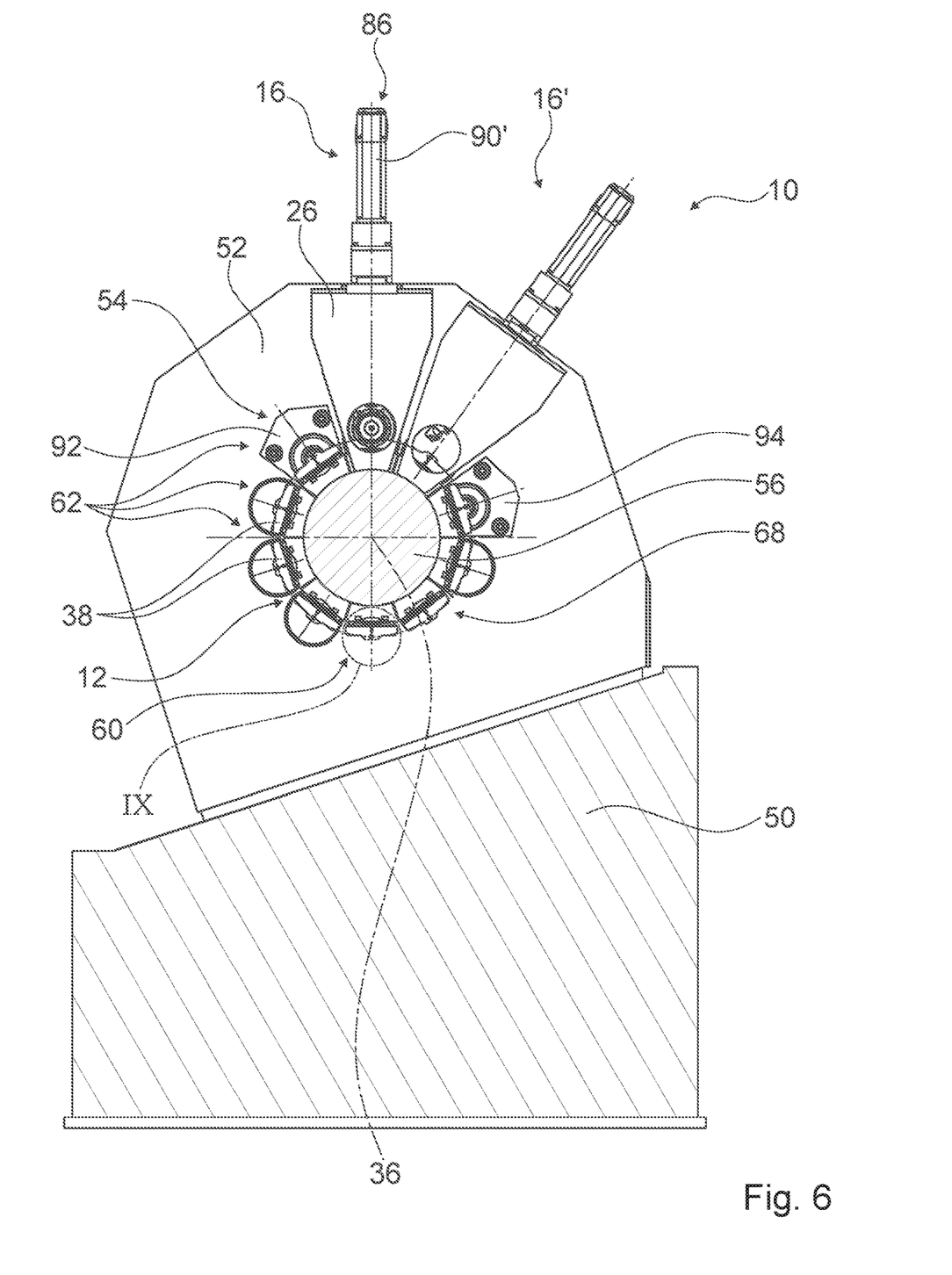
Figure 9:
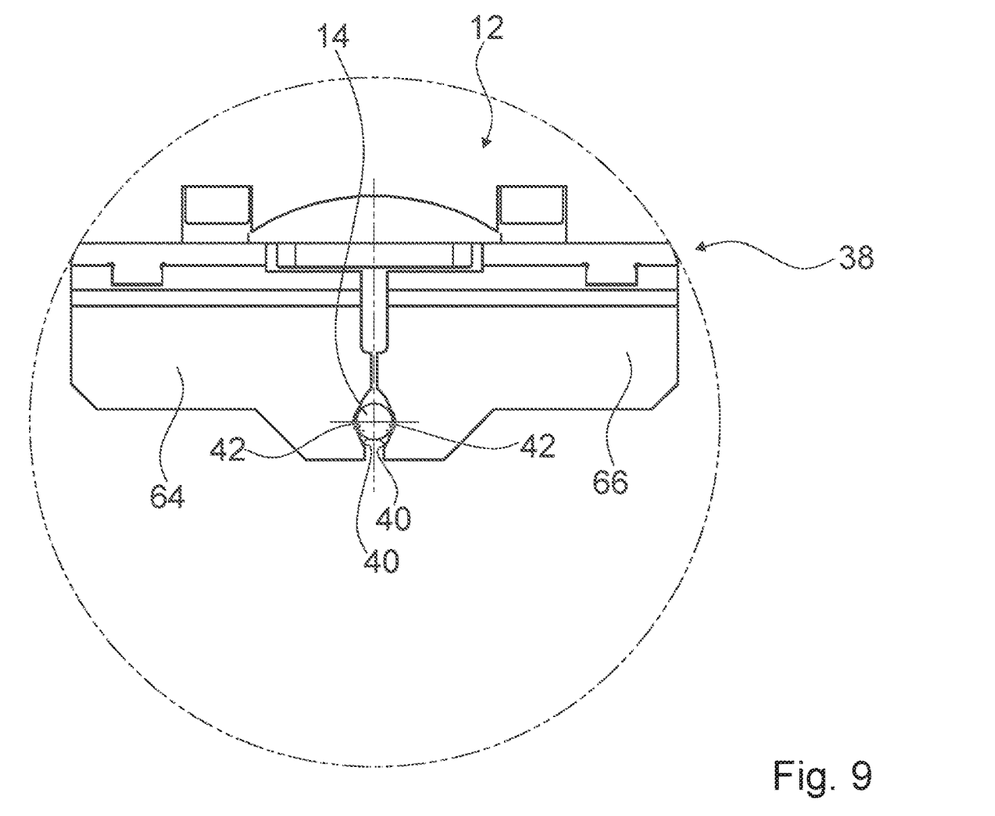

The rotary indexing machine 10 further comprises an indexing plate 12. The indexing plate 12 is embodied by a rotary indexing plate. The indexing plate 12 is arranged in the machining space 54. Furthermore the indexing plate 12 is implemented in such a way that it is rotatable about a rotary axis 36. The indexing plate 12 is rotationally drivable about the rotary axis 36 via a drive unit, which is not shown in detail. The indexing plate 12 is configured for accommodating and transporting work pieces 14 in at least one operating state. The indexing plate 12 comprises a substantially circle-shaped base body 56. The indexing plate 12 further comprises at least one gripping unit 38 for retrieving a work piece 14. The indexing plate 12 comprises a plurality of gripping units 38. As an example, the indexing plate 12 comprises ten gripping units 38. The gripping units 38 each implement a clamping station of the indexing plate 12. The gripping units 38 are embodied identically. The gripping units 38 are arranged on an outer circumference of the base body 56. The gripping units 38 are each configured for retrieving a work piece 14. The gripping units 38 are each configured to fixedly clamp a work piece 14. The gripping units 38 of the indexing plate 12 respectively comprise two gripping surfaces 40, 42 with substantially differing radii. The gripping units 38 respectively comprise two gripping elements 64, 66, which are implemented in such a way that they are movable with respect to one another. The gripping elements 64, 66 of a gripping unit 38 respectively form the gripping surfaces 40, 42 on sides facing one another. Both gripping elements 64, 66 respectively comprise a gripping surface 40 with a large radius and a gripping surface 42 with a small radius. The gripping surface 42 with a small radius is respectively integrated in the gripping surface 42 with a large radius. By means of the gripping units 38 it is possible to safely grip work pieces 14 having a large radius as well as work pieces 14 having a small radius. The radius of the first gripping surface 40 herein corresponds to a radius of the work piece 14 prior to a turning or milling machining, while the radius of the second gripping surface 42 corresponds to a radius of the work piece 14 after a turning or milling machining. The gripping units 38 each comprise an actuator (not shown in detail), via which the gripping units may be opened and closed. The actuator is configured for moving the gripping elements 64, 66. The actuator of the gripping units 38 is connected to a computing unit 58 of the rotary indexing machine 10. The computing unit 58 of the rotary indexing machine 10 is configured for a control and regulation of the processes of the rotary indexing machine 10. The indexing plate 12 is configured, during operation, to rotate the accommodated work pieces 14 by accurate angles after each machining cycle of the rotary indexing machine 10. The indexing plate 12 moreover defines, together with the side surfaces of the drive regions 52, 52', which mutually face each other, a first coordinate system, in which the work pieces 14 are accommodated. On side surfaces of the drive regions 52, 52', which mutually face each other, all the other devices used for machining the work pieces 14 are fixated directly or indirectly (FIGS. 6 and 9).

The rotary indexing machine 10 further comprises a plurality of stations. The stations are arranged in a circular shape around the indexing plate 12. The rotary indexing machine 10 comprises a loading station 60. On the loading station 60, the indexing plate 12 is loaded with work pieces 14. On the loading station 60, the work pieces 14 are embodied as blanks. Per each cycle, a gripping unit 38 of the indexing plate 12 is loaded with a work piece 14. In the loading station 60, in particular a continuous blank is fed in and is sectioned following a loading of the gripping unit 38 of the indexing plate 12. The rotary indexing machine 10 furthermore comprises a plurality of machining stations 62. The machining stations 62 directly abut on the loading station 60 in a circumferential direction. The machining stations 62 are each configured for carrying out different machining steps. During operation the indexing plate 12 conveys the work pieces 14, after the machining stations 62, in the circumferential direction, to respectively one further machining station 62 per cycle. For this purpose the indexing plate 12 carries out an angle-accurate rotation, thus moving the fixedly clamped work piece 14 to the following machining stations 62. After the loading station 60, at least one machining, which may be any machining, like for example drilling, milling, thread cutting, turning or the like, depending on a work piece 14, takes place on at least one following machining station 62 with at least one tool. If the indexing plate 12 has more stations than machining operations are required, an operation is not necessarily carried out on each machining station 62. For the sake of an overview, only some of the machining stations 62 are provided, to give an example, with clocking cells 16, 16', 92, 94 carrying out an operation. The clocking cells 92, 94 are, as an example, embodied by drilling clocking cells. Principally it would however also be conceivable that each machining station 62 is provided with a clocking cell 16, 16', 92, 94 for carrying out an operation on the work piece 14. The rotary indexing machine 10 moreover comprises an unloading station 68, in which the work piece 14 is removed from the indexing plate 12. The unloading station 68 implements a final station before a gripping unit 38 of the indexing plate 12 returns to the loading station 60 for the purpose of then loading the indexing plate 12 with a new work piece 14 on the loading station 60. The indexing plate 12 comprises exactly the same number of gripping units 38 as the number of stations comprised by the rotary indexing machine 10, as a result of which in each cycle a work piece 14 is fed in at the loading station 60, a finished work piece 14 is unloaded on the unloading station 68 and an operation is carried out on each machining station 62 (FIGS. 1 and 6).

The rotary indexing machine 10 further comprises a clocking cell 16. The clocking cell 16 implements a machining station 62 of the rotary indexing machine 10. The clocking cell 16 implements a turning machining station 62 of the rotary indexing machine 10. The clocking cell 16 is configured for a turning machining of the work piece 14. Principally however a different implementation of the clocking cell 16, deemed expedient by someone skilled in the art, would also be conceivable. The rotary indexing machine 10 furthermore comprises a further clocking cell 16', which is embodied substantially identically to the clocking cell 16. The further clocking cell 16' implements a further machining station 62 of the rotary indexing machine 10. As an example, the further clocking cell 16' is arranged directly next to the clocking cell 16. The further clocking cell 16' implements a machining station 62 which follows the machining station 62 of the clocking cell 16. Principally however a different implementation, deemed expedient by someone skilled in the art, would also be conceivable. The two clocking cells 16, 16' are configured for a pre-machining and for a post-machining of the work piece 14. The clocking cell 16 is configured for a pre-machining of the work piece 14. As an example, a large material abrasion is generated in the pre-machining. Furthermore, the further clocking cell 16' is configured for a post-machining of the work piece 14. In the post-machining only little material abrasion but a high-grade surface quality is generated. The clocking cells 16, 16' are embodied identically. Principally it would however be conceivable that the clocking cells 16, 16' comprise different tools, which are configured for different requirements. In the following, in particular only the clocking cell 16 will be described, the description being principally also transferable to the further clocking cell 16' (FIGS. 1 and 6).

Figure 4:
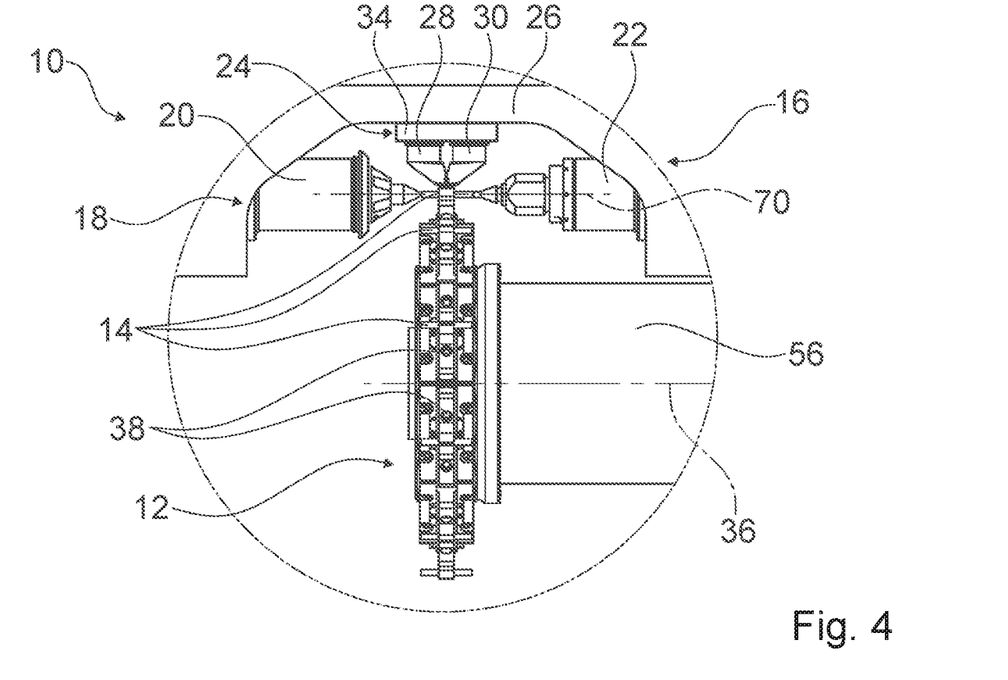
Figure 5:
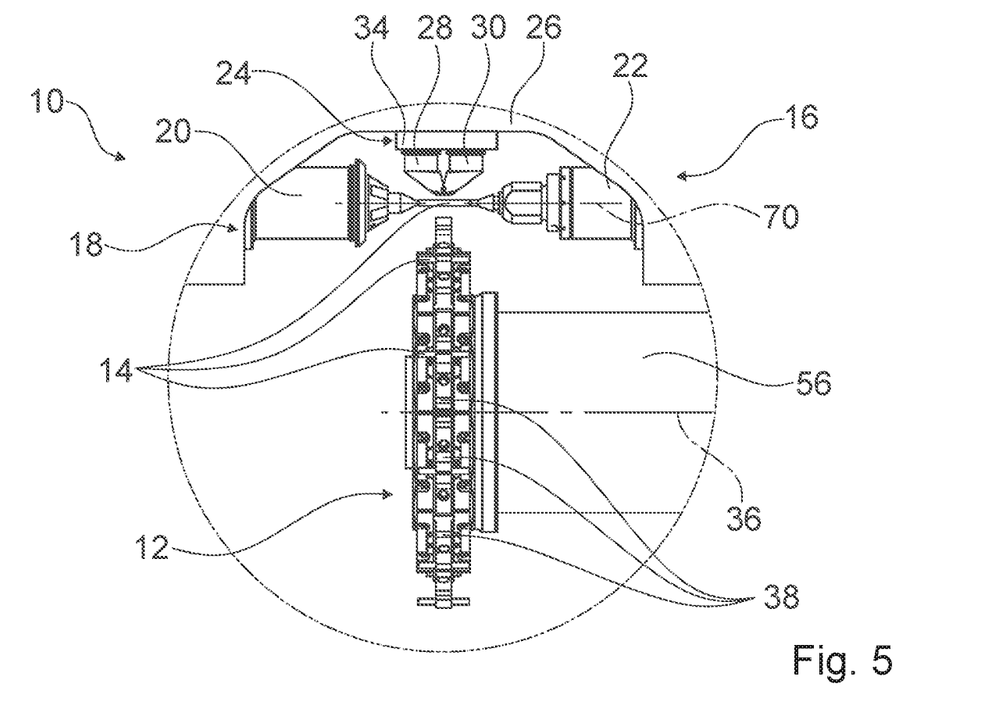

The clocking cell 16 comprises an accommodating unit 18. The accommodating unit 18 is configured to temporarily accommodate a work piece 14. The accommodating unit 18 is configured to briefly accommodate a work piece 14 during a cycle. The accommodating unit 18 comprises two opposite-situated accommodating elements 20, 22. The accommodating elements 20, 22 are configured for together accommodating a work piece 14 from the indexing plate 12. The accommodating elements 20, 22 are configured for together accommodating, during a cycle, the work piece 14 which is to be machined by the clocking cell 16 in said cycle from the indexing plate 12. The accommodating elements 20, 22 are each implemented by a lathe spindle. The accommodating elements 20, 22 are embodied in such a way that they are rotationally drivable. The accommodating elements 20, 22 are embodied, for a turning machining of the work piece 14, in such a way that they are rotationally drivable. The accommodating elements 20, 22 in particular comprise a drive unit (not shown) for a rotational driving of the accommodating elements 20, 22. The accommodating elements 20, 22 are embodied in such a way that they are rotatable about a shared rotary axis 70. Furthermore, for an accommodation of a work piece 14, the accommodating elements 20, 22 are embodied in such a way that they are translationally movable towards one another via a drive, which is not shown. Via the drive, the accommodating elements 20, 22 are movable towards one another as well as away from one another. The accommodating elements 20, 22 furthermore each comprise, on a free end, a centering element. The centering elements of the accommodating elements 20, 22 are respectively embodied by a centering mandrel. The centering elements of the accommodating elements 20, 22 are respectively configured to engage in a centering recess of the work piece 14. The work pieces 14 have centering bores on both ends, which the centering elements of the accommodating elements 20, 22 engage in. By means of the centering elements of the accommodating elements 20, 22, an accommodated work piece 14 is aligned with respect to the accommodating unit 18. The centering bores in the work pieces 14 are introduced in a previous machining station 62. Principally it would however also be conceivable that the centering bores are already introduced before a loading of the indexing plate 12. It would principally also be conceivable that accommodating elements 20, 22 have a centering inner cone on their free ends, above which inner cones the work pieces 14 are positioned (FIGS. 4 and 5).

Figure 7:
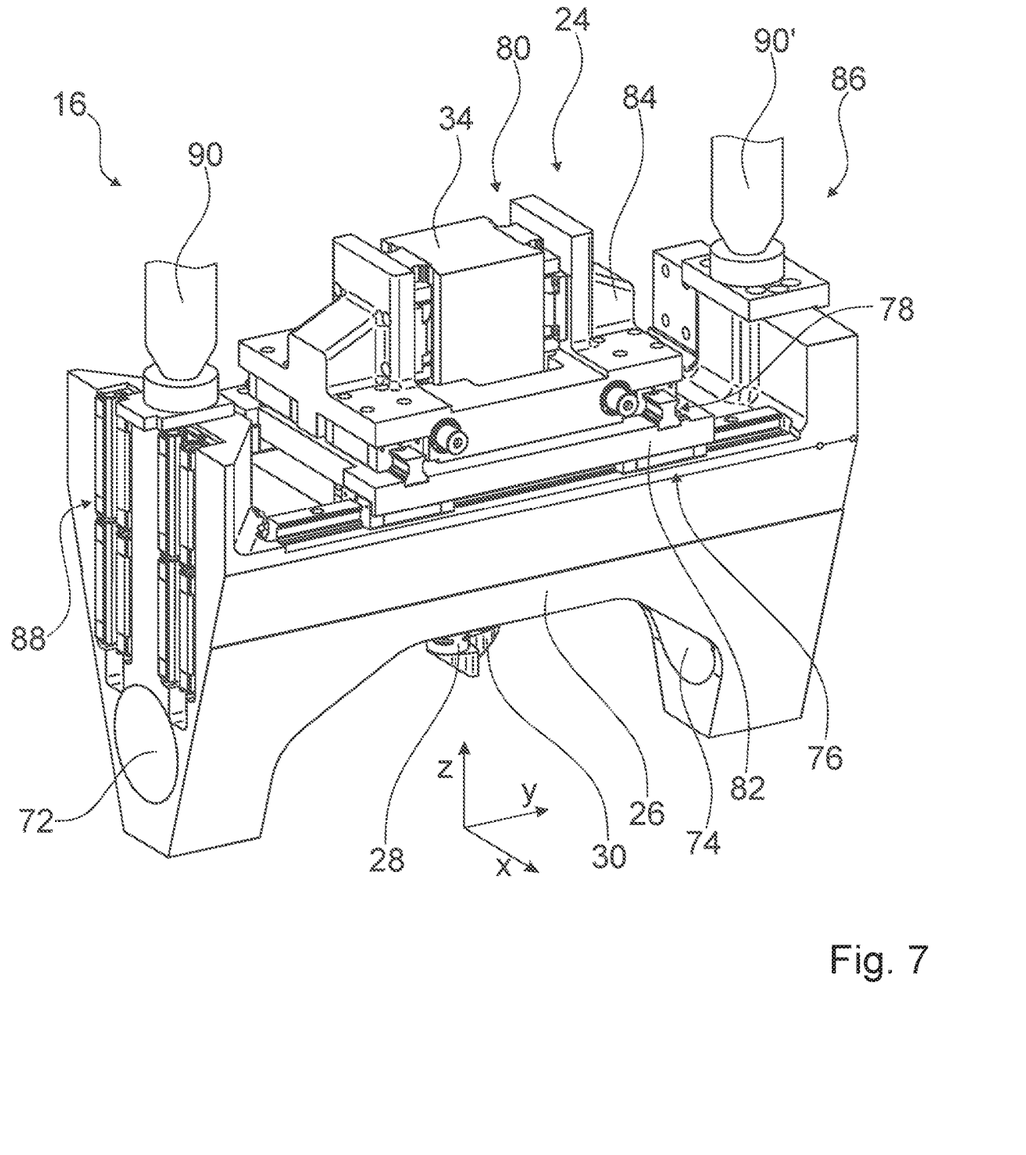

The clocking cell 16 further comprises a bridge unit 26 extending over the indexing plate 12 in an axial direction. Viewed in a direction along the rotary axis 36 of the indexing plate 12, the bridge unit 26 extends over the indexing plate 12. The bridge unit 26 extends through the machining space 54, in parallel to the rotary axis 36 of the indexing plate 12. The bridge unit 26 extends between the two drive regions 52, 52' of the rotary indexing machine 10. The bridge unit 26 is implemented of an inherently rigid, C-shaped frame. Viewed in a plane that is perpendicular to a rotary axis 36 of the indexing plate 12, the bridge unit 26 partially has a circle-sector shape. Viewed in the plane that is perpendicular to the rotary axis 36 of the indexing plate 12, the bridge unit 26 tapers towards the rotary axis 36 of the indexing plate 12. The bridge unit 26 is partially embodied in a shape of a circular-cylinder sector. The bridge unit 26 partly defines an outer form of the clocking cell 16. Viewed in a plane that is perpendicular to a rotary axis 36 of the indexing plate 12, the clocking cell 16 partially has a circle-sector shape. The clocking cell 16 is herein shaped in such a way that it fits into an area defined for the machining station 62 and consisting of a circle sector having an interior angle that is equivalent to 360° divided by the number of stations of the rotary indexing machine 10. The bridge unit 26 is configured for guiding the two accommodating elements 20, 22 of the accommodating unit 18 in a shared coordinate system. The bridge unit 26 is configured for guiding the two accommodating elements 20, 22 of the accommodating unit 18 in a coordinate system of the clocking cell 16. The clocking cell 16 has a coordinate system that differs from a coordinate system of the indexing plate 12. In this way it is in particular achievable that the work piece 14 may be removed from the coordinate system of the indexing plate 12 with the fixedly installed machining stations 62 and may be transferred into a new coordinate system of the clocking cell 16. The bridge unit 26 is also configured to receive the accommodating elements 20, 22 of the accommodating unit 18 in such a way that they are guided with respect to one another in a defined fashion. The bridge unit 26 comprises two opposite-situated guiding recesses 72, 74. The guiding recesses 72, 74 are arranged coaxially with respect to one another. The guiding recesses 72, 74 are respectively implemented by cylindrical recesses. The guiding recesses 72, 74 are respectively introduced in protrusions of the bridge unit 26 projecting towards the rotary axis 36 of the indexing plate 12. The accommodating elements 20, 22 are guided in the guiding recesses 72, 74 of the bridge unit 26. The accommodating elements 20, 22 are aligned with respect to one another in a manner defined via the guiding recesses 72, 74 of the bridge unit 26 (FIG. 7).

Figure 8:
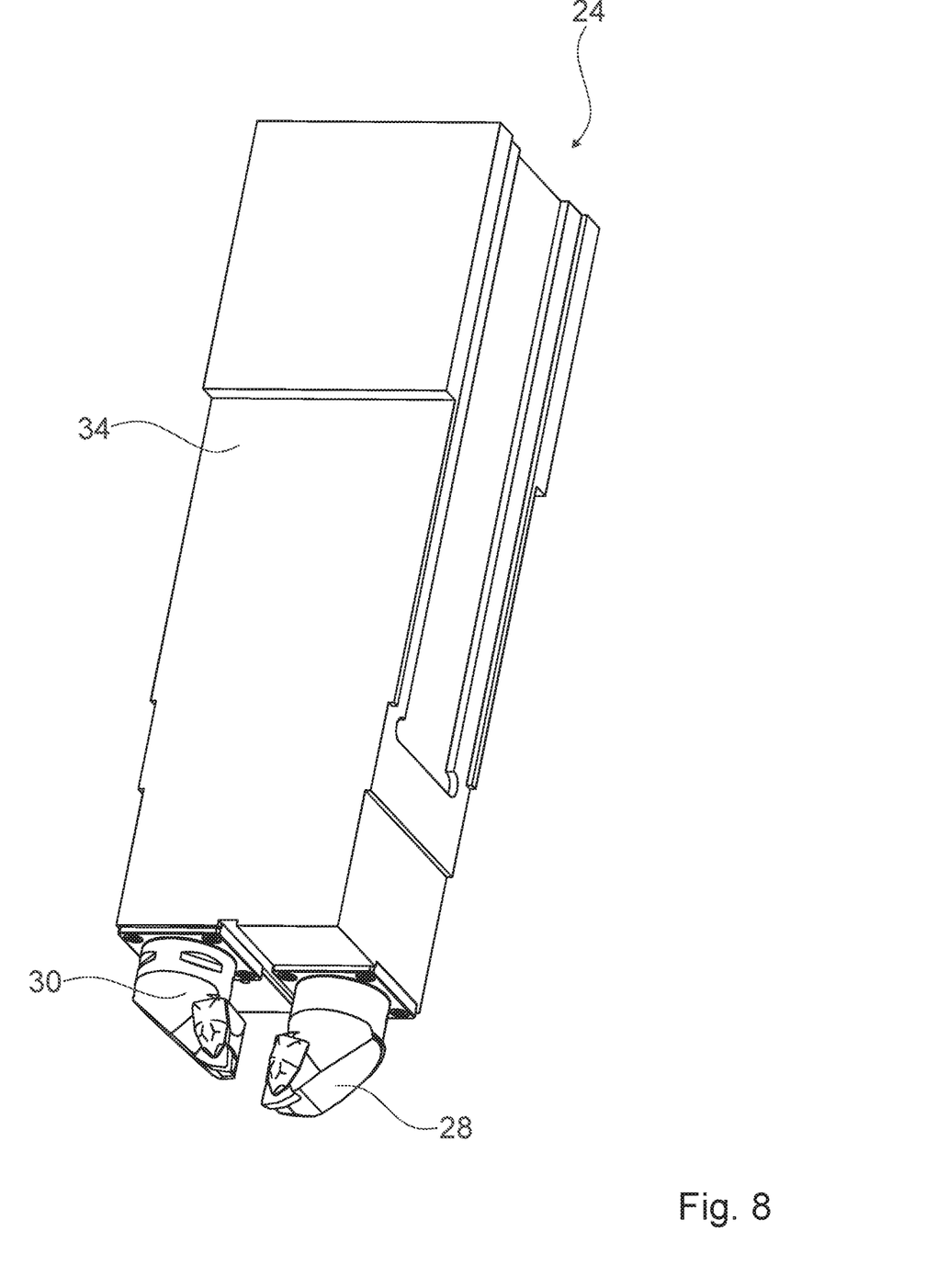

Furthermore the clocking cell 16 comprises a machining unit 24. The machining unit 24 is configured for a machining of the work piece 14 accommodated by the accommodating unit 18. The machining unit 24 is configured for a turning machining of the work piece 14 accommodated by the accommodating unit 18. During machining the work piece 14 is rotationally driven by means of the accommodating unit 18 and is machined by means of the machining unit 24. The machining unit 24 works in the coordinate system of the clocking cell 16. The machining unit 24 thus works in the same coordinate system as the accommodating unit 18. The machining unit 24 is fixedly connected to the bridge unit 26. The machining unit 24 is arranged on the bridge unit 26. The machining unit 24 is aligned with respect to the accommodating unit 18 in a manner defined by the bridge unit 26. The machining unit 24 is further partially movable with respect to the bridge unit 26. The machining unit 24 comprises a tool carrier 34. The tool carrier 34 is embodied in such a way that it is movable with respect to the bridge unit 26. The clocking cell 16 comprises a hydraulic unit, which is not visible in detail. The hydraulic unit constitutes a portion of the machining unit 24. The hydraulic unit is configured for moving a tool carrier 34 of the machining unit 24 with respect to the bridge unit 26. The clocking cell 16 furthermore comprises an electrical drive, which is not shown in detail. The electrical drive forms part of the machining unit 24. The electrical drive is configured for moving a tool carrier 34 of the machining unit 24 with respect to the bridge unit 26. The electrical drive is configured for moving a tool carrier 34 of the machining unit 24 perpendicularly to a rotary axis 36 of the indexing plate 12. For carrying out a turning operation, the tool carrier 34 is moved towards the work piece 14 perpendicularly to the rotary axis 36 of the indexing plate 12 by means of the electrical drive. Furthermore the tool carrier 34 is traversed with respect to the work piece 14 depending on a machining task. The tool carrier 34 has three degrees of freedom with respect to the bridge unit 26. The tool carrier 34 has, with respect to the bridge unit 26, a degree of freedom along an x-axis, along a y-axis and along a z-axis. The machining unit 24 comprises guiding units 76, 78, 80. A first guiding unit 76 guides the tool carrier 34 along an x-axis. The first guiding unit 76 comprises guiding rails, which are fixedly connected to the bridge unit 26. The first guiding unit 76 also comprises guiding sledges, which are arranged on a first intermediate frame 82 of the machining unit 24 and are guided on the guiding rails of the first guiding unit 76. A second guiding unit 78 guides the tool carrier 34 along a z-axis. The second guiding unit 78 comprises guiding rails, which are fixedly connected to the first intermediate frame 82, as well as guiding sledges, which are arranged on a second intermediate frame 84 of the machining unit 24 and are guided on the guiding rails of the second guiding unit 78. A third guiding unit 80 guides the tool carrier 34 along a z-axis. The third guiding unit 80 comprises guiding rails, which are fixedly connected to the second intermediate frame 84, as well as guiding sledges, which are arranged on the tool carrier 34 of the machining unit 24 and are guided on the guiding rails of the third guiding unit 80. A movement of the tool carrier 34 with respect to the bridge unit 26 is partially controlled via an electrical drive, which is not shown in detail. The guiding unit 78 is controlled via an electrical drive, which is not shown in detail. The electrical drive comprises, for example, two electrical axial drives, which are not shown in detail. The electrical axial drives herein respectively serve for separately actuating the y-axis and the z-axis. The electrical axial drives are arranged on the first and third guiding units 76, 80. The hydraulic unit comprises, for example, a hydraulic axial drive, which is not shown in detail. The hydraulic axial drive is arranged on the second guiding unit 78. The intermediate frame 84 is controlled via the hydraulic axial drive. The hydraulic axial drive serves for separately actuating the x-axis. The hydraulic axial drive is embodied by plunger cylinders. Principally however a different implementation deemed expedient by someone skilled in the art would also be conceivable (FIGS. 7 and 8).

The machining unit 24 comprises two tools 28, 30 for a machining of the work piece 14. The tools 28, 30 are each embodied by a turning tool. The tools 28, 30 are each embodied by a turning chisel. The tools 28, 30 are arranged on a free end of the tool carrier 34. The tools 28, 30 are fixed in their positions with respect to one another. The tools 28, 30 are arranged on the tool carrier 34 in such a way that they are fixed in their positions. The tools 28, 30 are embodied in such a way that they are exchangeable. The tools 28, 30 are alternatingly usable for a turning machining. The tools 28, 30 are used separately from one another. A tool 28, 30 to be used is selected depending on a type of the tool and/or depending on an orientation of the tool 28, 30 with respect to the work piece 14. The actually required tool 28, 30 is selected by positioning the tool carrier 34 along the x-axis (FIGS. 7 and 8).

Furthermore the clocking cell 16 is embodied in such a way that it is traversable with respect to the indexing plate 12. The clocking cell 16 comprises a drive unit 86, by which the clocking cell 16 is movable with respect to the indexing plate 12. The clocking cell 16 is translationally traversable by the drive unit 86. The clocking cell 16 is traversable, by the drive unit 86, in a direction that is perpendicular to the rotary axis 36 of the indexing plate 12. The clocking cell 16 is therefore movable towards the indexing plate 12 or away from the indexing plate 12. The drive unit 86 is implemented of a gantry drive. The drive unit 86 comprises two guiding systems 88, which are respectively arranged on the sides of the bridge unit 26. The guiding systems 88 are respectively arranged on the sides of the bridge unit 26 which face towards the drive regions 52, 52'. The drive unit 86 comprises a guiding system 88 for each side of the bridge unit 26 respectively. The guiding systems 88 are each embodied by guiding rails. Furthermore the drive unit 86 comprises two drive motors 90, 90'. The drive motors 90, 90' are arranged on the bridge unit 26. The drive motors 90, 90' are operated synchronously. By means of the drive motors 90, 90' the clocking cell 16 is movable with respect to the housing 50 of the rotary indexing machine 10 (FIG. 7).

By a traversing of the clocking cell 16 with respect to the indexing plate 12, a work piece 14 may be removed from a fixedly clamped position of the indexing plate 12 by means of the accommodating unit 18 and may be moved away from the indexing plate 12 for machining. Due to the entire clocking cell 16 being moved, the coordinate system of the clocking cell 16 remains inherently rigid. By a traversing of the clocking cell 16 with respect to the indexing plate 12, a work piece 14 is therefore removable from and possibly returnable to a fixedly clamped position of the indexing plate 12—and thus from, possibly to a first coordinate system of the indexing plate 12—without a further transport device being required. FIGS. 2 and 4 herein respectively show the clocking cell 16 in a removal position. For gripping a work piece 14 of the indexing plate 12 or for laying down the work piece 14 in the indexing plate 12, the clocking cell 16 has in the removal position a minimum possible distance from the indexing plate 12. FIGS. 3 and 5 respectively show the clocking cell 16 in a machining position. The clocking cell 16 has in the machining position a maximum possible distance from the indexing plate 12 to allow the clocking cell 16 free machining of the work piece 14 (FIGS. 4 and 5).

The clocking cell 16 constitutes a closed system, which is suitable for re-fitting in an existing rotary indexing machine 10.

Figure 10:
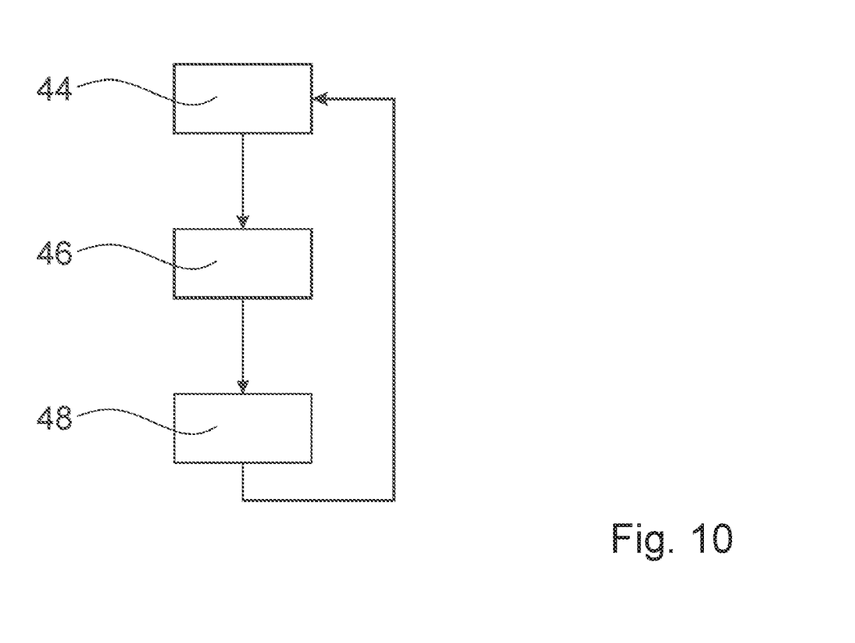

FIG. 10 shows a schematic flow chart of a method for operating the rotary indexing machine 10. The method describes an operation of the clocking cell 16. The method describes a cycle of the clocking cell 16. A cycle is started with a removal step 44. In the method, in the removal step 44, the clocking cell 16 of the rotary indexing machine 10 is brought into a removal position above the indexing plate 12 of the rotary indexing machine 10 and a work piece 14 is removed from the indexing plate 12 by an accommodating unit 18 of the clocking cell 16. In the removal step 44 the accommodating unit 18 is closed to accommodate the work piece 14. Herein the work piece 14 is accommodated which is in this cycle allocated to the clocking cell 16. For this purpose the accommodating elements 20, 22 become translationally movable towards one another by the drive, which is not shown in detail. In an accommodation, the work piece 14 is aligned with respect to the clocking cell 16 by means of the centering elements of the accommodating elements 20, 22. In an accommodation, the work piece 14 is aligned with respect to the coordinate system of the clocking cell 16 by means of the centering elements of the accommodating elements 20, 22. Following this, the corresponding gripping unit 38 of the indexing plate 12, which grips the respective work piece 14, is opened. Herein the work piece 14 is removed from the coordinate system of the indexing plate 12 and is transferred into the coordinate system of the clocking cell 16. Then follows a machining step 46. In the machining step 46 the clocking cell 16 is brought into a machining position away from the indexing plate 12, and the work piece 14 is machined by a machining unit 24 of the clocking cell 16. In the machining step 46 the clocking cell 16 is traversed out of the removal position, away from the indexing plate 12, into a machining position by means of the drive unit 86. The accommodating elements 20, 22 of the accommodating unit 18 are then rotationally driven around the rotary axis 70 by means of the drive unit which is not shown. By the rotation of the accommodating elements 20, 22, the work piece 14 is rotated around the rotary axis 70. The rotary axis 70 in particular corresponds to a symmetry axis of the work piece 14. Following this, one of the tools 28, 30 is traversed to the work piece 14 by a movement of the tool carrier 34. A position of the tool carrier 34 is controlled via the electrical drive, which is not shown in detail. By traversing one of the tools 28, 30 to the rotating work piece 14, a turning machining of the work piece 14 is effected. Following the turning machining, a rotation of the accommodating elements 20, 22—and thus a rotation of the work piece 14—is stopped. Then follows a feeding step 48. In the feeding step 48 the clocking cell 16 is brought into the removal position above the indexing plate 12, and the work piece 14 is laid into a gripping unit 38 of the indexing plate 12 by means of the accommodating unit 18 of the clocking cell 16. In the feeding step 48 the clocking cell 16 is traversed out of the machining position to the indexing plate 12 by the drive unit 86. As a result of this, the work piece 14 is arranged between the opened gripping unit 38. The respective gripping unit 38 of the indexing plate 12, which is configured for accommodating the respective work piece 14, is then closed. Herein the work piece 14 is removed from the coordinate system of the clocking cell 16 and is returned into the coordinate system of the indexing plate 12. Principally it would however also be conceivable that, in particular depending on a position of the clocking cell 16 in the rotary indexing machine 10, the work piece 14 is directly removed from the rotary indexing machine 10 or is transferred into the first coordinate system or into a further coordinate system for machining. Following this, the accommodating unit 18 of the clocking cell 16 is opened. For this purpose the accommodating elements 20, 22 become translationally movable away from one another by means of the drive, which is not shown in detail. Then the cycle is finished and the indexing plate 12 is rotated onward to the subsequent station of the rotary indexing machine 10. The cycle of the clocking cell 16 is followed by another cycle of the clocking cell 16, and the method is re-started anew with the removal step 44. The removal step 44, the machining step 46 and the feeding step 48 are carried out during one cycle of the rotary indexing machine 10.

The invention claimed is:

1. A rotary indexing machine, comprising:
   an indexing plate, which is in at least one operating state configured to accommodate and transport at least one work piece, the indexing plate comprising a plurality of gripping units, which grippers that are regularly distributed in a circumferential direction; and
   a clocking cell comprising:
      an accommodating unit with two oppositely-situated accommodating elements, which are configured for together accommodating the at least one work piece from the indexing plate and are further configured to grip the at least one work piece from opposite directions and to clamp the at least one work piece there between, and
      a machining unit for machining the at least one work piece accommodated by the accommodating unit, wherein the machining unit is configured for a turning machining of the at least one work piece accommodated by the accommodating unit, wherein the at least one work piece is driven, in a state when accommodated by the two accommodating elements, by the accommodating unit such that the at least one work piece rotates about a center axis,
   wherein the clocking cell further comprises a bridge unit, which extends at least partially over the indexing plate in an axial direction and is configured to guide the two accommodating elements of the accommodating unit in a shared coordinate system, wherein the machining unit is arranged on the bridge unit and wherein the clocking cell is movable as a whole with respect to the indexing plate, and
   wherein the clocking cell further comprises a drive unit by which the clocking cell is movable as a whole with respect to the indexing plate, and the drive unit comprises two guiding systems that are respectively arranged on opposing sides of the bridge unit and two drive motors that are arranged on the bridge unit.

2. The rotary indexing machine according to claim 1, wherein
   the bridge unit is configured to accommodate the accommodating elements of the accommodating unit in such a way that they are guided with respect to one another in a defined fashion.

3. The rotary indexing machine according to claim 1, wherein
   the machining unit is fixedly connected to the bridge unit.

4. The rotary indexing machine according to claim 1, wherein
   the machining unit comprises at least two tools for the turning machining of the at least one work piece.

5. The rotary indexing machine according to claim 1, wherein
   the clocking cell comprises at least one hydraulic unit, which is configured for moving a tool carrier of the machining unit transversely to a rotary axis of the indexing plate.

6. The rotary indexing machine according to claim 1, wherein
   when viewed in a plane that is perpendicular to a rotary axis of the indexing plate, the bridge unit has at least partially a circular-sector shape.

7. The rotary indexing machine according to claim 1, further comprising:
   at least one further clocking cell, which is embodied identically to the clocking cell.

8. The rotary indexing machine according to claim 7, wherein
   at least one of the clocking cell and the at least one further clocking cell is configured for a pre-machining and/or for a post-machining of the at least one work piece.

9. The rotary indexing machine according to claim 1, wherein
   at least one gripper of the plurality of grippers for accommodating the at least one work piece, has at least two gripping surfaces with different radii.

* * * * *